United States Patent [19]
Donaldson et al.

[11] Patent Number: 5,297,269
[45] Date of Patent: Mar. 22, 1994

[54] CACHE COHERENCY PROTOCOL FOR MULTI PROCESSOR COMPUTER SYSTEM

[75] Inventors: Darrel D. Donaldson, Lancaster, Mass.; Mark N. Howard, Issaquah, Wash.; David A. Orbits, Redmond, Wash.; John M. Parchem, Seattle, Wash.; David M. Robinson, Bellevue, Wash.; Douglas Williams, Pepperel, Mass.

[73] Assignee: Digital Equipment Company, Maynard, Mass.

[21] Appl. No.: 66,597

[22] Filed: May 24, 1993

Related U.S. Application Data

[63] Continuation of Ser. No. 514,716, Apr. 26, 1990, abandoned.

[51] Int. Cl.$^5$ ............................................... G06F 12/00
[52] U.S. Cl. ................................. 395/425; 395/725; 395/325; 364/DIG. 1; 364/238.4; 364/246.8; 364/243.41
[58] Field of Search ................. 395/425, 725, 325

[56] References Cited

U.S. PATENT DOCUMENTS

| | | | |
|---|---|---|---|
| 3,422,401 | 1/1969 | Luching | 340/172.5 |
| 3,510,844 | 5/1970 | Aranyi et al. | 340/172.5 |
| 3,735,360 | 5/1973 | Anderson et al. | 340/172.5 |
| 3,771,137 | 11/1973 | Barner et al. | 340/172.5 |
| 3,967,247 | 6/1976 | Anderson et al. | 340/172.5 |
| 4,136,386 | 1/1979 | Annunziata et al. | 364/200 |
| 4,195,342 | 3/1980 | Joyce et al. | 364/200 |
| 4,394,727 | 7/1983 | Hoffman et al. | 364/200 |
| 4,394,731 | 7/1983 | Flusche et al. | 364/200 |
| 4,471,429 | 9/1984 | Porter et al. | 364/200 |
| 4,527,238 | 7/1985 | Ryan et al. | 364/200 |
| 4,551,799 | 11/1985 | Ryan et al. | 364/200 |
| 4,622,631 | 11/1986 | Frank et al. | 364/200 |
| 4,695,951 | 9/1987 | Hooker et al. | 364/200 |
| 4,755,930 | 7/1988 | Wilson, Jr. et al. | 395/425 |
| 4,785,395 | 11/1988 | Keeley | 364/200 |
| 4,897,782 | 1/1990 | Bennett et al. | 364/200 |
| 4,928,225 | 5/1990 | McCarthy et al. | 364/200 |
| 4,977,498 | 12/1990 | Rastegar et al. | 364/200 |
| 4,992,930 | 2/1991 | Gilfeather et al. | 364/200 |

OTHER PUBLICATIONS

"Cache Memories" by Alan Jay Smith Computing Surveys, Vo. 14, No. 3 Sep. 1982.

*Primary Examiner*—Eddie F. Chan
*Attorney, Agent, or Firm*—Kenyon & Kenyon

[57] ABSTRACT

A cache coherency protocol for a multi-processor system which provides for read/write, read-only and transitional data states and for an indication of these states to be stored in a memory directory in main memory. The transitional data state occurs when a processor requests from main memory a data block in another processor's cache and the request is pending completion. All subsequent read requests for the data block during the pendency of the first request are inhibited until completion of the first request. Also provided in the memory directory for each data block is a field for identifying the processor which owns the data block in question. Data block ownership information is used to determine where requested owned data is located.

27 Claims, 5 Drawing Sheets

CACHE COHERENCY PROTOCOL FOR MULTI PROCESSOR COMPUTER SYSTEM

This is a continuation of application Ser. No. 514,716 filed Apr. 26, 1990 now abandoned.

FIELD OF THE INVENTION

The invention is directed to the field of multi-processor computer systems and, more particularly, to multi-processor computer systems wherein each of the central processing units in a system has a write-back cache memory and is coupled by a point-to-point connection to a cross bar switch unit that is, in turn, coupled, point-to-point, to several main memory modules.

BACKGROUND OF THE INVENTION

Modern day computer systems frequently comprise a central processing unit and a memory hierarchy including a relatively large, but relatively slow main memory module and a relatively fast, but relatively small cache memory coupled between the central processing unit and the main memory module. The data and instructions being processed at any one time by the central processing unit are temporarily stored in the cache memory to take advantage of the high speed of operation of the cache memory to thereby increase the overall speed of operation of the computer system. The use of a cache memory is based upon the principles of temporal locality and spatial locality. More specifically, when a central processing unit is accessing data and instructions from a particular space within physical memory, it will most probably access the data and instructions from that space and, in addition, access data and instructions from contiguous space, for a certain period of time. Accordingly, data blocks, including the contiguous space of physical memory where data being utilized by the central processing unit resides, are placed in the cache memory to greatly decrease the time required to fetch data and instructions from those frequently referred to data blocks.

A cache memory scheme may be either a write-through cache or a write-back cache. In a write-through cache, a central processing unit writes through to main memory whenever it writes to an address in cache memory. In a write-back cache, the central processing unit does not update the main memory at the time of writing to its cache memory but updates the memory at a later time. For example, when the central processing unit is changing the contents of its cache memory, it will send the latest copy of written-to data to the main memory before it refills the space within the cache occupied by the written-to data. In this manner, the speed of operation of the central processing unit is not slowed down by the time that would be required to update the main memory after each write operation. Instead, the main memory is updated at the completion of the operations relating to the data block contained in the cache memory.

Many computer systems operate on the basis of the concept of a single, simple copy of data. In a multi-processor system including several central processing units, each with its own write-back cache, incoherencies within the data arise when one of the central processing units writes to a data block in its cache memory. In other words, when a particular central processing unit writes to its cache, the main memory will not have a correct copy of the data until the central processing unit updates the main memory.

If a particular central processing unit requests a data block currently in the cache of another central processing unit of the multi-processor system and that data block has been written to by such other central processing unit on a write-back basis, as described above, a coherency scheme must be utilized to insure that the latest correct copy of the data is sent to the requesting central processing unit. Typically, heretofore known multi-processor systems have implemented a so-called "snoopy" protocol in a shared bus configuration for the several central processing units of the system to assure that the latest copy of a data block is sent to a requesting central processing unit.

Pursuant to the snoopy protocol, all of the central processing units of the multi-processor system are coupled to the main memory through a single, shared bus. Each of the caches of the several central processing units and any other devices coupled to the shared bus "snoop" on (i.e. watch or monitor) all transactions with main memory by all of the other caches. Thus, each of the caches is aware of all data blocks transferred from main memory to the several other caches throughout the multi-processor system. Inasmuch as the caches are coupled to the main memory by a single, shared bus, it is necessary to implement an arbitration mechanism to grant access to the shared bus to one of possibly several devices requesting access at any particular time. The arbitration mechanism will effectively serialize transactions with the main memory and the snoopy protocol utilizes the serialization to impose a rule that only one cache at a time has permission to modify a data block.

After modification of the data block in the one cache, the main memory does not contain a valid copy of the data until it is updated by the cache having the written to block, as described above. In accordance with the snoopy protocol, the copy of the written to data block in the one cache is substituted for the main memory copy whenever another cache requests that data block prior to the update of the main memory.

An ownership model of the snoopy protocol includes the concept of "ownership" of a data block. A device must first request and obtain ownership of a data block in its cache before it can write to that data block. At most one device can own a data block at any one time and the owner always has the valid copy of that data block. Moreover, the owner must update the main memory before it relinquishes ownership of the block to assure coherency of the data throughout the multi-processor system.

By definition, ownership means the right to modify a data block. When no device of the system owns a data block it is said to be owned by the main memory and copies of the data block may be "shared" by any of the devices of the system. A shared mode means the device has read only access to a shared copy of a data block residing in its cache. Since the main memory owns the data block in the shared mode, all shared copies exactly match the main memory and are, hence, correct copies. Once any one device other than main memory obtains ownership of a data block, no other device may share the block and all copies of the data block which are shared are invalidated at the time ownership is obtained by the one device.

It is implicit above that a single request is made and acted upon at a time on the shared bus. Hence all bus requests are ordered and all caches and the memory see them in the same order. It is also implicit above that the memory does not respond to a request if some cache owns the data; instead the owning cache supplies the data. This is typically done by having each cache search itself for the data with each bus request. If a cache finds that it owns the data, it suppresses memory (which could otherwise respond), typically with a signal wire for this purpose, and applies the data to the bus itself.

In a variation of the ownership model, the main memory includes a directory of all main memory lines to ensure that data coherency is maintained throughout the multi-processor system. The directory contains an entry for each data block in the main memory and each entry comprises a bit mask of $k+1$ bits. The number k equals the number of caches in the system with each one of the k bits of the mask corresponding to one of the caches. The extra bit of the $k+1$ bits provides the ownership status of the corresponding data block. Thus, if the $(k+1)$ bit is on, then one and only one of the remaining bits can also be on since only one cache at a time can have write privileges to a data item.

The main memory utilizes the directory to provide a centralized cache coherency system. The main memory queries the directory for each read or write request that it receives from the various central processing units in the multi-processor system to determine the current state of the requested data item, i.e. owned or shared, depending upon the state of the $(k+1)$ bit, and the location of copies of the data item, as indicated by the remaining bits of the bit mask.

The information obtained from the directory enables the main memory to enforce the coherency scheme. For example, if a data block is not owned and a read only copy is present in several of the caches, the $(k+1)$ bit will be off and the bits corresponding to the caches that have a copy of the data block will each be on. If another central processing unit, which does not have a copy of the data block wants to write to the data block, it sends a request to the main memory for the data block with write privileges. The main memory will query the directory to determine that the data block is not presently owned and that copies reside in several of the caches. The main memory will send an invalidate signal to all of the caches where a copy of the data block resides, as indicated by the bits of the bit mask and then set the $k+1$ bit to now indicate the owned state.

The main memory further sets the bit corresponding to the requesting cache. The main memory can perform similar operations upon each read or write request to determine the state and location of any data block and to reset the bit mask and send control signals as required to maintain data coherency.

The above-described coherency protocols provide a highly effective scheme for maintaining data coherency throughout a multi-processor system including devices having write-back caches. However, a major drawback of the scheme is that only one device at a time may access main memory due to the single shared bus coupling all of the devices to the main memory and the necessity of serializing all transactions with the main memory. Thus, the maximum speed of operation theoretically possible in a system having parallel central processing units is diminished in practical applications since only one central processing unit at a time can complete a transaction with the main memory through the shared bus. Moreover, each device coupled to the shared bus must devote certain resources to an active and continuous monitoring of the shared bus in accordance with the snoopy protocol.

SUMMARY OF THE INVENTION

The present invention provides a multi-node system. The nodes may be, for example, several central processing units, each being connected to one or more memories by a memory/node coupling mechanism. The memory/node coupling mechanism may be a cross bar switch unit coupled point-to-point to one or more main memory modules and nodes and wherein each node (central processing unit or other devices) of the system has a write-back cache. In accordance with the invention, cache coherency throughout the system is maintained by each main memory module through a novel memory directory resident on the module.

The point-to-point connections through the cross bar switch increase the speed of operation of the system by permitting several connections between central processing units and the main memory modules to be made simultaneously. The memory directory of each main memory module contains several coherency state fields for each data block stored in the module to indicate the coherency state of the data block. Each main memory module enforces coherency throughout the multi-processor system for data block stored within the module by making a query to its memory directory upon each data transfer operation which affects or may be affected by the coherency state of a data block and issuing appropriate commands to implement data transfers while maintaining coherency in the system.

Pursuant to the invention, the coherency state fields provide the memory module with complete information on the coherency state of each data block including ownership status of the block, an owner ID to uniquely identify a particular cache which owns a modified data block, a copy mask to indicate which caches have a copy of a shared data block and a lock-status bit to indicate that an interlock instruction is being executed. In this manner, the memory module can enforce a cache coherency policy in a highly efficient and speedy operation. For example, the owner-ID information enables the memory module to immediately identify and forward commands to a current owner during a transfer of ownership operation.

In addition, in accordance with a feature of the invention, the ownership status information includes transitional states to indicate outstanding data and ownership transfer operations. Thus, the processing of read and write requests can be expedited, as for example, through efficient use of the cross-bar switch and a pipelined operation, so that subsequent read and write operations can be initiated prior to the completion of a current read or write operation. The transitional states tell the main memory module whether an outstanding data transfer operation regarding a particular data block is being executed so that the memory module can block or inhibit a subsequent read request for that data block until the already commenced operation has been completed. The transitional states therefor provide an automatic conflict check mechanism during accelerated cache operations.

DETAILED DESCRIPTION

Figure 1:
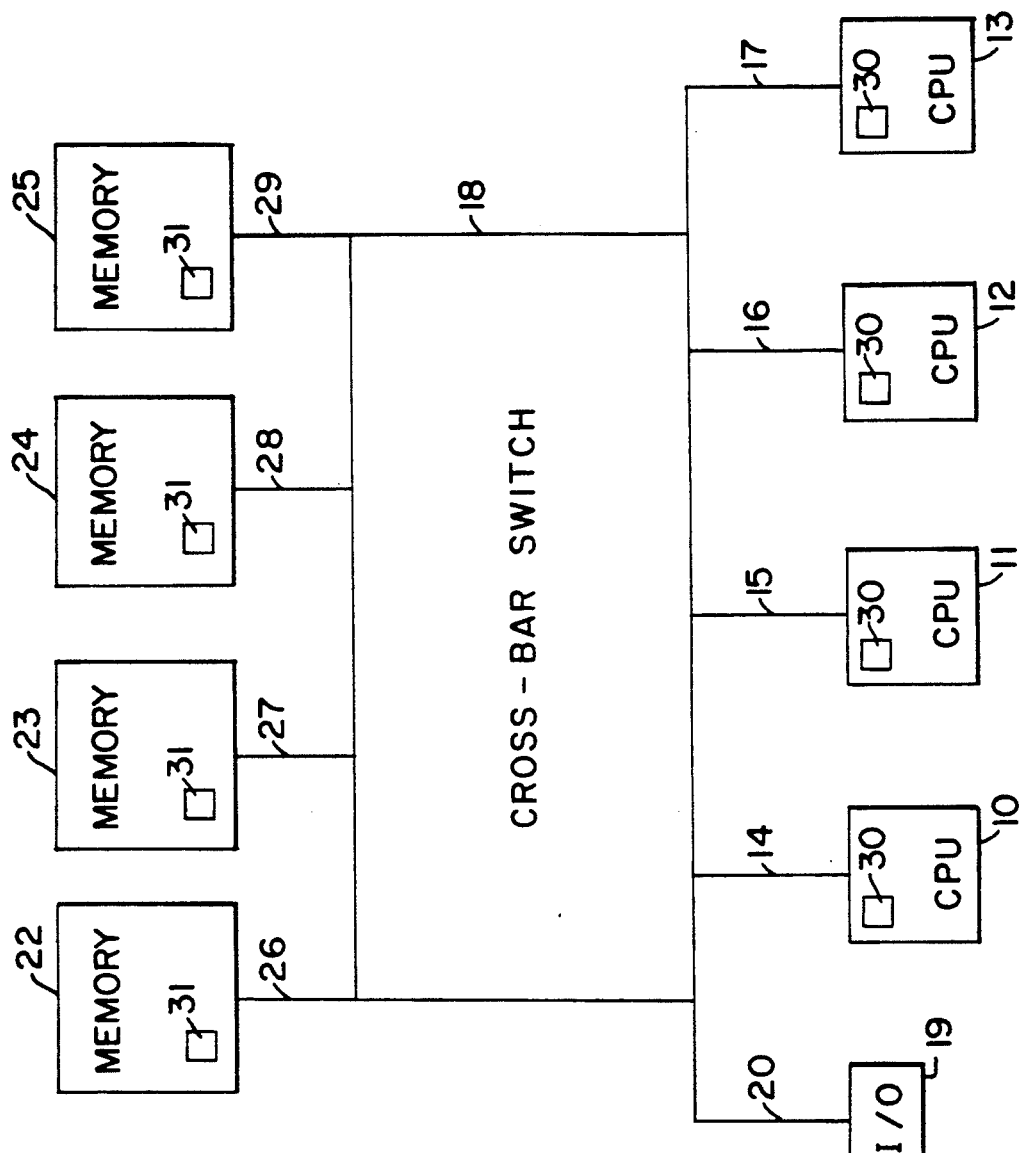
FIG. 1 is a block diagram of a multi-processor system according to the invention.

Referring now to the drawings and initially to FIG. 1, there is illustrated a multi-processor computer system in accordance with an exemplary embodiment of the present invention. Each one of several nodes, for example, four central processing units (CPU's) 10, 11, 12 and 13 includes a write back cache memory 30, as known in the art, and is coupled by a channel 14, 15, 16 and 17, respectively, to a cross bar switch unit 18. An I/O adapter 19 is also coupled by a channel 20 to the cross bar switch unit 18. The I/O adapter is, in turn, coupled to one or more peripheral devices (not illustrated). Moreover, each of several (for example, four) main memory modules 22, 23, 24, 25 is coupled by channels 26, 27, 28 and 29, respectively, to the cross bar switch unit.

Each of the main memory modules 22-25 stores a preselected portion of the data and instructions currently comprising the main memory of the system. Preselected subsets of the main memory that are fetched from one or more of the main memory modules 22-25 reside in the various cache memories 30 to facilitate high speed operation of the system. When a particular CPU 10-13 seeks to access data, it first looks for the data in its cache memory 30. If the data is present in the cache memory 30, a "cache hit" is said to occur and the CPU 10-13 receives the data from the cache memory 30. When the data is not present in the cache memory 30, a "cache miss" signal is asserted and the CPU 10-13 must then fetch the data from the main memory module 22-25 where the data resides.

In the event of a cache miss, the CPU 10-13 must issue a request command to the main memory module 22-25. This command provides address information to the cross bar switch 18 which operates to create a path via the appropriate channels 14-17 and 26-29 between the requesting CPU 10-13 and the particular main memory module 26-29 where the data identified by the address information resides. The data may then be communicated back to the requesting CPU 10-13 by the main memory module 26-29 for storage in the cache memory 30 associated with the requesting CPU 10-13.

As discussed above in the Background of the Invention section, if the requesting CPU 10-13 then writes to the data, the copy of the data residing in the main memory module 22-25 or in any other cache memory 30 in the system will no longer be valid. The multi-processor data coherency protocol of the present invention operates to invalidate all other copies of the data and make certain that the latest copy in the requesting CPU 10-13 is used for subsequent requests for that data.

Pursuant to the invention, the main memory modules 22-25 are provided with a memory directory 31. Preferably, there is one memory directory per memory module. The memory directory maintains coherency state information on each of a multiplicity of data blocks within the corresponding main memory module 22-25. A data block refers to a preselected amount of addressable data, for example, 64 bytes, which is transferred to a cache memory upon each CPU 10-13 request for data. The memory directory 31 enables each one of the main memory modules 22-25 to ascertain coherency state information which affects or is affected by any data transfer operations between the main memory module 22-25 and any of the cache memories 30 in the system. The main memory module utilizes the coherency state information in its directory to issue commands which implement data transfers while maintaining coherency throughout the multi-processor system for all data blocks which reside in the main memory module 22-25.

Figure 2:
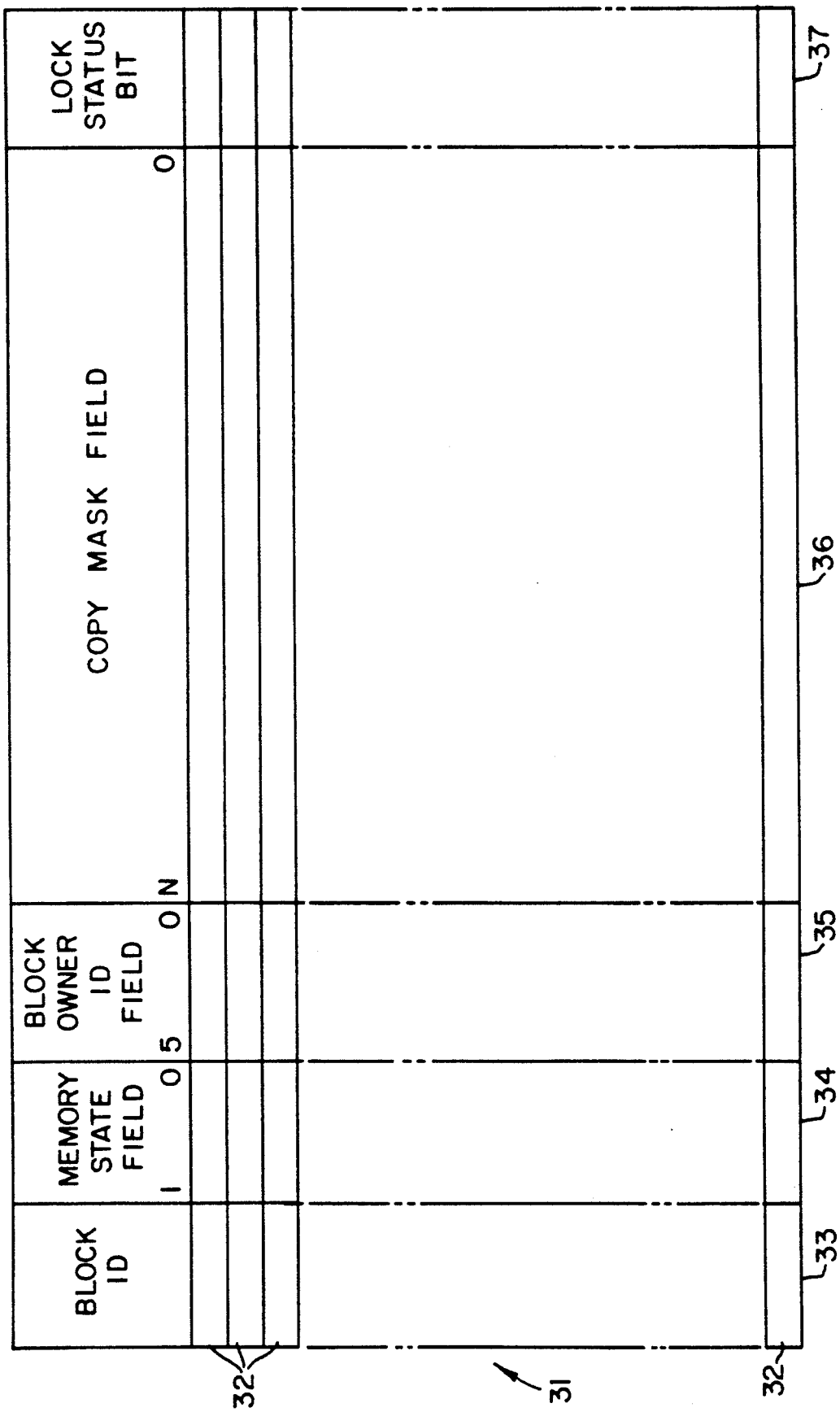
FIG. 2 is a block diagram of a memory directory of a memory module of the system of FIG. 1.

Referring now to FIG. 2, there is illustrated the details of a memory directory 31 in accordance with an exemplary embodiment of the invention. The memory directory 31 has an entry 32 for each data block in the corresponding main memory module 22-25. Each entry includes a block ID field 33 to uniquely identify a particular data block residing in the main memory module 22-25. Next to each block ID field are four coherency state fields for that block: a Memory-State field 34, a Block-Owner ID field 35, a Copy-Mask field 36, and a Lock-Status field 37. Theses fields are defined, as follows:

1. Memory-State field 34—The current ownership state of the block in the main memory module 22-25, either SHARED-UNMODIFIED, EXCLUSIVE-MODIFIED, FORWARD-EXCLUSIVE, FORWARD-SHARED, or UNOWNED. This field requires two bits per block.

SHARED-UNMODIFIED: The data block is present in zero or more cache memories 30 and is not modified. The main memory module 22-25 has a valid copy and all cache copies are READ-ONLY.

EXCLUSIVE-MODIFIED: The data block is present in exactly one cache memory 30 that owns the data block and the data is modified, i.e., the data in the data block has been written by the CPU 10-13 associated with the cache memory that owns the data and is inconsistent with the copy in the main memory module 22-25. The one owner CPU 10-13 has READ/WRITE access to the data block.

FORWARD-EXCLUSIVE: The data block is present in exactly one cache memory 30 and is modified. In addition, there is an outstanding Read Exclusive command (see below) to the block from another cache memory 30. Any additional read commands to this block force the main memory module 22-25 to stop processing all new read commands until the outstanding Read Exclusive is completed. This is a transitional state for the memory. There is no corresponding state for the cache.

FORWARD-SHARED: The data block is present in exactly one cache memory 30 and is modified. In addition, there is an outstanding READ SHARED command (see below) to the block from another cache memory 30. Any additional read commands to this data block force the main memory module 22-25 to stop processing all new read commands until the outstanding READ SHARED command is completed.

UNOWNED: The data block is not present in any cache memory 30. This state is implemented with a Memory-State of SHARED-UNMODIFIED and a Copy-Mask (see below) of all zeros.

2. Block-owner field 35—A six bit field containing a unique Owner-ID of the CPU 10-13 with a cache memory 30 containing a modified copy of the data. Changes to this field occur upon the issuance of a Read Exclusive (see below) command.

For either of the FORWARD states, the Block-Owner field contains the Owner-ID of the CPU 10-13 for the read command being processed.

3. Copy-Mask field 36—A bit field used in conjunction with an Invalidate command (see below) to assist the memory module 22-25 in determining if it is required to invalidate copies the data block identified by the block ID of the entry field 36. The Copy-Mask field 36 contains a bit corresponding to each of the cache memories 30. The bit is set when a copy of the data block is in the cache corresponding to the bit.

4. Lock-Status bit 37—A single bit data field per data block in the system. This bit is used to implement the interlock mechanism.

CPU Coherency Information

Each CPU 10-13 must maintain local state information for each data block in its cache memory 30.

Figure 3:
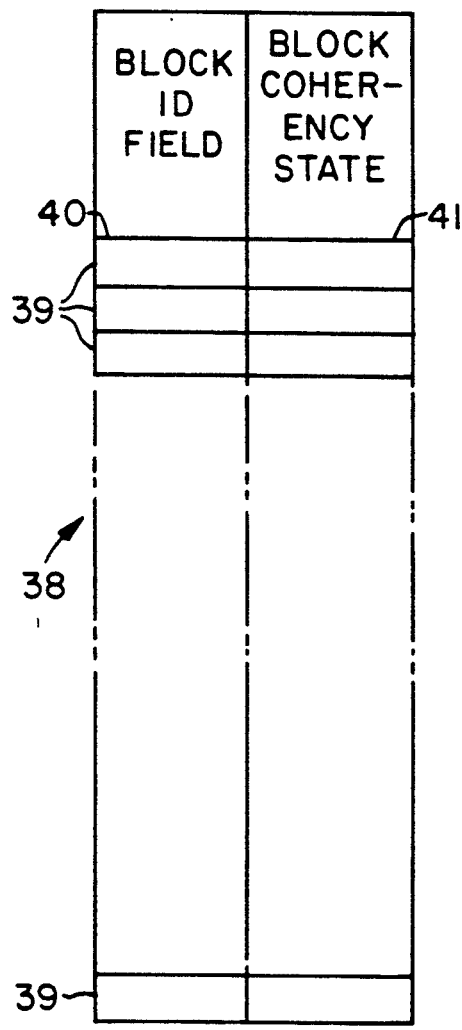
FIG. 3 is a block diagram of a data block state directory associated with the cache of a central processing unit of the system of FIG. 1.

Thus, each CPU 10-13 is provided with a data block state directory 38 as illustrated in FIG. 3. The data block state directory has an entry 39 for each data block-sized location in the cache memory 30. Each entry contains a block ID field 40 to identify the specific data block residing in the corresponding location in the cache memory 30 and a block coherency state field 41 to indicate the coherency state of the data block.

Each data block in each cache memory 30 can be in one of three possible states:

1. INVALID: The data block does not contain valid data.
2. SHARED-UNMODIFIED: The data block is valid, and some other cache memory 30 may have this block. The main memory module 22-25 is the owner. The CPU 10-13 has READ-ONLY access to the data block.
3. EXCLUSIVE-MODIFIED: The data block is valid, and no other cache memory 30 has this block. The data in the data block has been modified by the CPU 10-13 associated with the cache memory 30, and is therefore inconsistent with main memory. The CPU 10-13 has READ/WRITE access to the data block.

A data block in the EXCLUSIVE-MODIFIED state is written back to its main memory module 22-25 when evicted on a cache miss or when a Read Shared command to the block is received, as explained in more detail below.

Coherency Commands

Data coherency is maintained through the use of the memory directories and the node block state directories in conjunction with the following commands issued by the main memory modules 22-25 and the CPU's 10-13. The commands issued by the CPUs 10-13 are as follows:

Read Shared (Rd-Shr)—requests one of the main memory modules 22-25 to send a read-only copy of a data block.

Read Exclusive (Rd-Ex)—requests one of the main memory modules 22-25 to send a writable copy of a data block.

Write Unowned (Wrt-Un)—writes modified data back to a main memory module 22-25 and clears the data block location for new data. This command is issued when a modified data block is evicted on a cache miss. This occurs when the location occupied by the modified data block is needed to store a new data block needed due to the cache miss.

Write Shared (Wrt-Shr)—write modified data back to a main memory module 22-25 but keeps a read-only copy; generated when a forwarded Read Shared is asserted by another CPU 10-13 and the data requested by the other CPU 10-13 is owned by the CPU 10-13 which asserts the Write Shared command.

Read Data Response (RDAT)—sends read data to another CPU 10-13; generated by a Read Shared or a Read Exclusive that hits in the cache.

Forward Acknowledge (FACK)—notifies the appropriate main memory module 22-23 that a forwarded Read Exclusive command has been processed.

The commands issued by a main memory module 22-25 to the CPU's 10-13 are as follows:

Read Data Response (RDAT)—read data

Forward Read Shared (Fwd-Shr)—requests a cache memory 30 to write a modified block back to main memory module 22-23 and forward a copy to another CPU 10-13.

Forward Read Exclusive (Fwd-Ex)—requests a cache memory 30 to forward a modified block to another CPU 10-13 and return a Forward Acknowledge command to the main memory module 22-23.

Invalidate (INVAL)—tells all cache memories 30 having a copy of a particular data block to set the invalid state 41 for the block in the state directory 38 associated with the cache memory 30, this command is ignored in a cache memory 30 with the block marked EXCLUSIVE-MODIFIED in its state directory 38.

General Description of Coherency Operations

A general description of the operation of the multiprocessor system as related to cache coherency is written in terms of a CPU 10-13 reference to its cache memory 30, of which there are four possible outcomes, Read Hit, Read Miss, Write Hit, and Write Miss. In addition, either Miss case may result in an Eviction.

READ HIT—The data block is in the cache memory in the either SHARED-UNMODIFIED or the EXCLUSIVE-MODIFIED state and is returned to the CPU 10-13 with no coherency protocol overhead.

READ MISS—The data block is either invalid or not in the cache memory 30 and the CPU 10-13 or its cache memory 30 sends a Read Shared command to the appropriate main memory module 22-25. Whenever a CPU 10-13 or its cache memory 30 issues a Read Shared command, the data block state directory shall indicate the state of the needed data block as SHARED-UNMODIFIED PENDING. The SHARED-UNMODIFIED PENDING state is transitional and shall be changed to the SHARED-UNMODIFIED state upon receipt by the CPU 10-13 or its cache memory 30 of a Read Data response command containing the needed data block. When a Read Shared command is received by the main memory module 22-25, main memory checks the ownership state of the block in its memory director 31 and performs the following:

1. If the ownership state is of the SHARED-UNMODIFIED, the block may be sent immediately and the memory ownership state remains SHARED-UNMODIFIED.

2. If the ownership state is EXCLUSIVE-MODIFIED, the state is changed to FORWARD-SHARED, and a Forward Read Shared command is sent to the CPU 10-13 which owns the data block. When the owner receives the Forward Read Shared it sets the state in its state directory 38 to SHARED-UNMODI- FIED, sends the data block with a Read Data Response to the CPU 10-13 that requested the data block and finally sends a Write Shared command containing the modified block of data to update the main memory module 22-25. Should the owner CPU 10-13 voluntarily replace the data block before the Forward Read Shared arrives, the CPU 10-13 ignores the Forward Read Shared command. In this case, the main memory module 22-25 will forward the requested data to the requesting CPU 10-13 as a side effect of the Write Unowned command asserted by the owner CPU 10-13. When the main memory module 22-23 receives either the Write Shared or the Write Unowned (voluntary eviction case) command, it changes the ownership state to SHARED-UNMODIFIED.

3. If the ownership state is FORWARD-SHARED, the main memory module 22-23 blocks the Read Shared, and blocks all further requests for that data block. When the Forward Read Shared associated with the FORWARD-SHARED state completes, the ownership state changes to SHARED-UNMODIFIED. The main memory module 22-25 then restarts the blocked Read Shared, and completes the actions described above under SHARED-UNMODIFIED.

4. If the ownership state is FORWARD-EXCLUSIVE, the main memory module 22-25 blocks the Read Shared, and blocks all further read requests for that data block. When the Forward Read Exclusive associated with the FORWARD-EXCLUSIVE state completes, the ownership state will be changed to EXCLUSIVE-MODIFIED. The main memory module 22-25 then restarts the blocked Read Shared, and completes the actions described above under EXCLUSIVE-MODIFIED WRITE HIT—If the coherency state for the data block in the state directory 38 associated with the CPU 10-13 is EXCLUSIVE-MODIFIED the write may proceed without any additional overhead. The SHARED-UNMODIFIED state (implies READ-ONLY access) in the state directory 38 is treated as Write Miss.

WRITE MISS—The data block is not in the cache memory 30 or the state in the state directory 38 is either invalid or SHARED-UNMODIFIED, the CPU 10-13 or its cache memory 30 sends a Read-Exclusive command to the appropriate memory module 22-25. Whenever a CPU 10-13 or its cache memory 30 issues a Read-Exclusive command, the data block state directory shall indicate the state of the needed block as EXCLUSIVE-MODIFIED PENDING. The EXCLUSIVE-MODIFIED PENDING state is transitional and will be changed to EXCLUSIVE-MODIFIED upon receipt by the CPU 10-13 or its cache memory 30 of a Read Data Response command containing the needed data block. When a Read-Exclusive command is received by the main memory module 22-25, main memory checks the ownership state of the block in its memory directory 31, and performs the following.

1. If the ownership state is SHARED-UNMODIFIED and the Copy-Mask is all zeros (no possible Read-Only copies, i.e. UNOWNED state), the data block is sent immediately and the ownership state is set to EXCLUSIVE-MODIFIED. If the Copy-Mask is non-zero, an Invalidate command is broadcast to all CPU's 10-13 (ignored by the CPU 10-13 which requested the data block since its local state is EXCLUSIVE-MODIFIED), and then the data block is sent and the ownership state is set to EXCLUSIVE-MODIFIED.

2. If the ownership state is EXCLUSIVE-MODIFIED, the state is changed to FORWARD-EXCLUSIVE, and a Forward Read Exclusive command is sent to the owner CPU 10-13. When the owner CPU 10-13 receives the Forward Read Exclusive it sets its local state to INVALID, sends the data block with a Read Data Response to the requesting CPU 10-13, and finally sends a Forward Acknowledge command to the main memory module 22-25.

Should the owner CPU 10-13 voluntarily replace the block before the Forward Read Exclusive arrives, the CPU 10-13 ignores the Forward Read Exclusive. In this case, the main memory module 22-23 will forward the requested data to the requesting CPU 10-13 as a side effect of the Write Unowned command executed by the owner CPU 10-13.

When the main memory module 22-25 receives either the Forward Acknowledgement or the Write Unowned (voluntary eviction case) command, it changes the ownership state to EXCLUSIVE-MODIFIED.

3. If the ownership state is FORWARD-SHARED, the main memory module 22-25 blocks the Read Exclusive, and blocks all further requests for that data block. When the Forward Read Shared associated with the FORWARD-SHARED state completes, the ownership state is changed to SHARED-UNMODIFIED. The main memory module 22-23 then restarts the blocked Read Exclusive, and completes the actions described above under SHARED-UNMODIFIED.

4. If the ownership state is FORWARD-EXCLUSIVE, the main memory module 22-25 blocks the Read Exclusive, and blocks all further read requests for that data block. When the Forward Read Exclusive associated with the FORWARD-EXCLUSIVE state completes, the ownership state is changed to EXCLUSIVE-MODIFIED. The memory then restarts the blocked Read Exclusive, and completes the actions described above under EXCLUSIVE-MODIFIED.

REPLACEMENT—Action is required only when an EXCLUSIVE-MODIFIED block is replaced in a cache memory 30. The CPU 10-13 or its cache 30 sends a Write Unowned to the appropriate main memory module 22-25, which changes the ownership state from EXCLUSIVE-MODIFIED to UNOWNED. If the ownership state is FORWARD-SHARED when the write unowned command is received, the main memory module forwards the modified data block to the CPU 10-13 with the outstanding read command, and sets the ownership state to SHARED-UNMODIFIED. If the ownership state if FORWARD-EXCLUSIVE when the write unowned command is received, the main memory module 22-25 forwards the modified data to the CPU 10-13 with the outstanding read, and sets the ownership state to EXCLUSIVE-MODIFIED.

Figure 4:
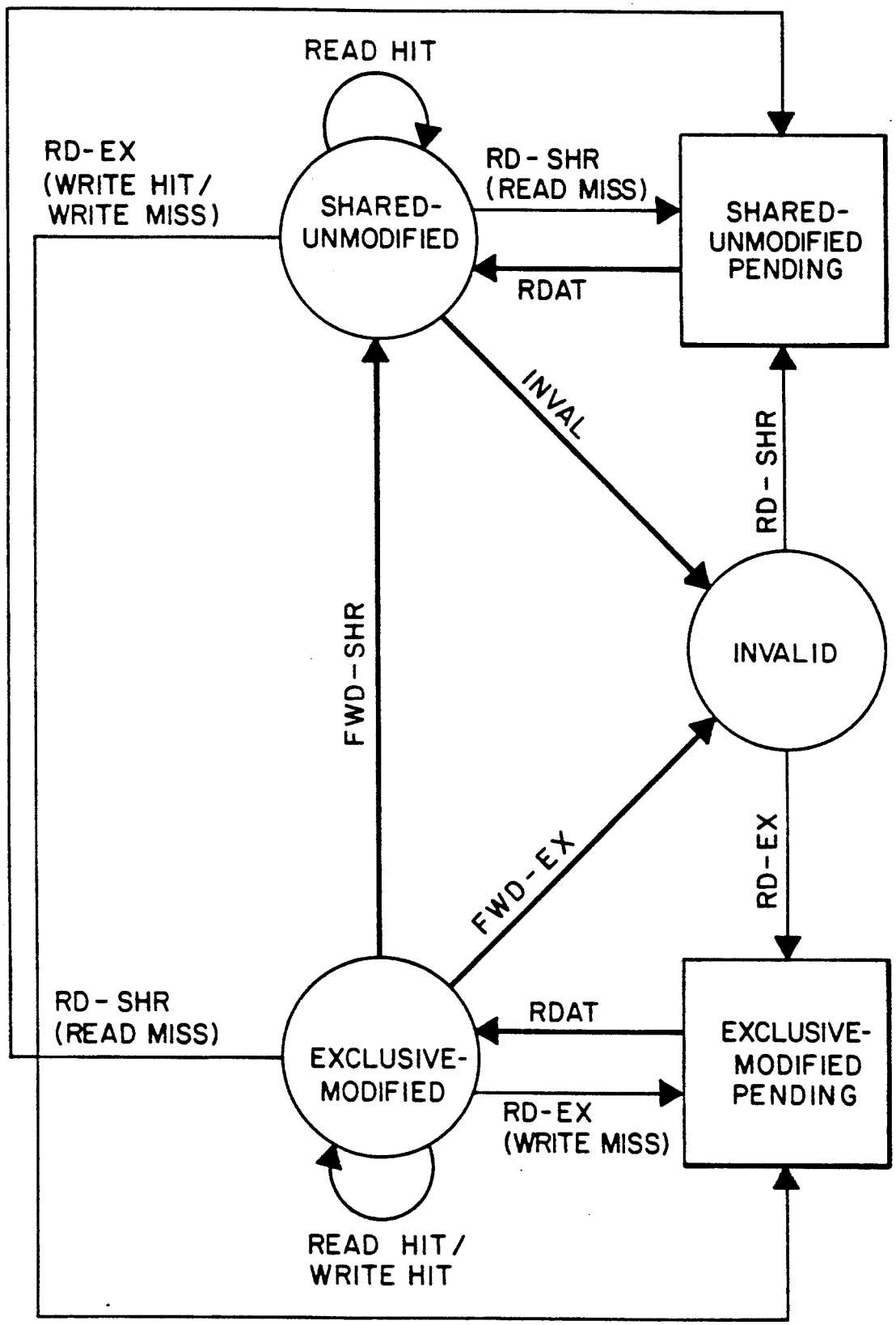
FIG. 4 is a cache block state diagram showing all possible states for a data block in a cache and the commands causing transitions between states.
Figure 5:
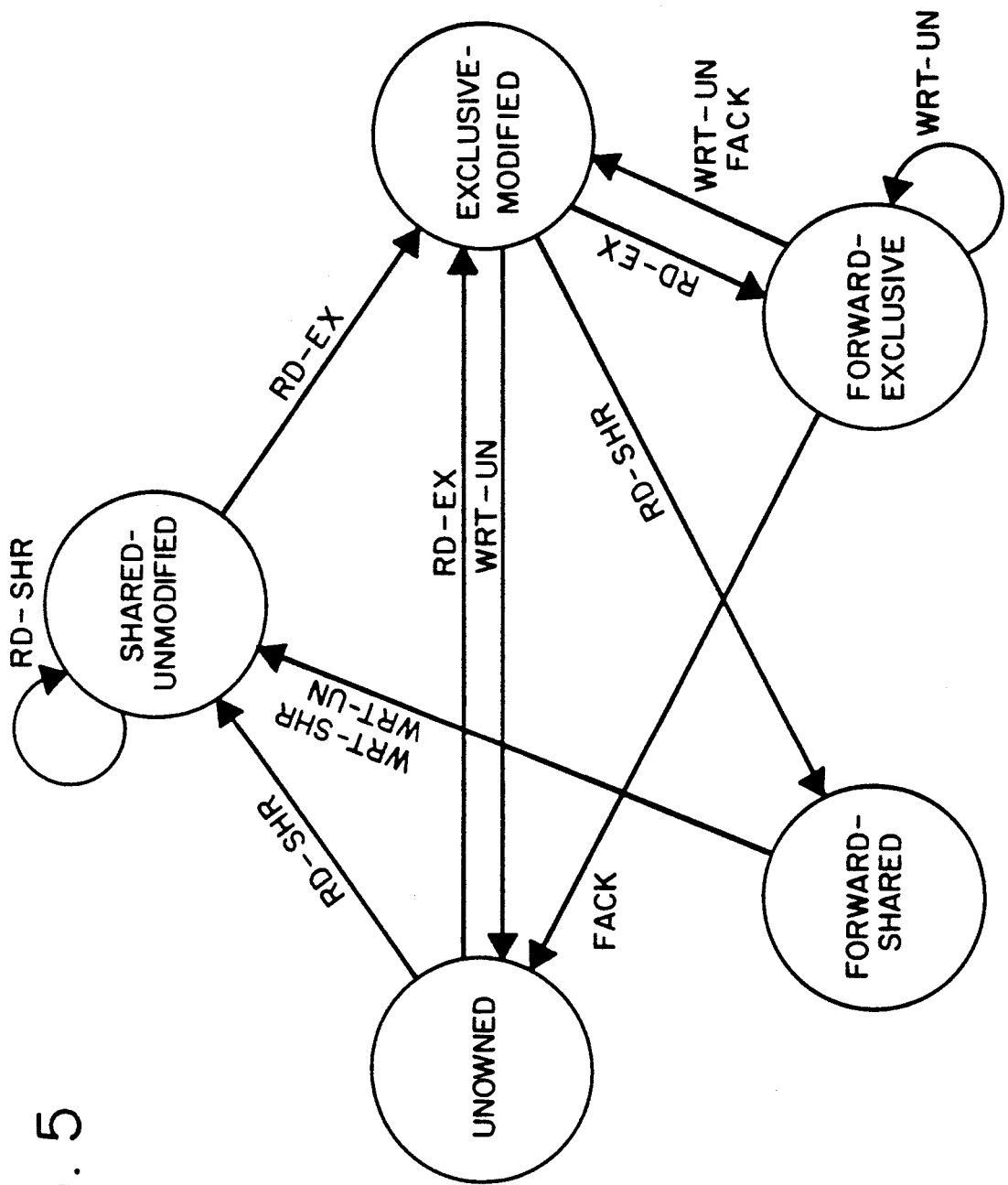
FIG. 5 is a memory state diagram showing all possible states for a data block in main memory and the commands causing transitions between states.

Graphical representations of the coherency operations described above for both a cache and for main memory are depicted in FIGS. 4 and 5, respectively. These figures depict cache and memory states as enclosed in labeled circles or squares and commands driving the transition between such states as labeled connecting arrows.

The coherency protocol of the present invention supports the use of hardware interlocks through an "interlock protocol." The interlock protocol provides a "lock status" bit that follows the data wherever it travels in the computer system and is stored with the data whenever it is owned. More specifically, lock status is transmitted with every write data and read data transfer, and stored in cache whenever the cache maintains the data in the EXCLUSIVE-MODIFIED state. Also, lock status is stored in the memory directory of main memory.

The interlock protocol is summarized as follows:

1. For each Write Unowned and Write Shared command issued by a processor, lock status is transmitted along with the command to main memory.

2. For each Read Response command issued by a processor or main memory, lock status is transmitted along with the data.

3. Each data block in a cache in the EXCLUSIVE-MODIFIED state has lock status bit encoded in the field representing the state. This creates two variants of the state: EXCLUSIVE-MODIFIED (when the data block is unlocked) and EXCLUSIVE-MODIFIED-LOCKED (when the interlock is set).

4. Each block in memory has a lock status bit in its associated entry in the memory directory. This bit indicates the last interlock status in the system recorded in main memory for the data block.

At initialization, main memory clears all lock status bits in the memory directory, and all data blocks are indicated as being in the UNOWNED state.

When a processor issues a Read Exclusive command, it will receive a Read Response with the lock status bit set or clear, depending upon the value of the lock status of the data block in the responding processor's cache. If the lock status bit is set, the cache state for the data block is updated to EXCLUSIVE-MODIFIED-LOCKED; otherwise the data block's state remains EXCLUSIVE-MODIFIED.

When a processor receives a Forward Read Exclusive or Forward Read Shared command, it supplies the requested data with a Read Response command with the lock status bit set or cleared, depending on the value of the lock status of the data block in the responding processor's cache. The lock status bit would be set if the block is in the EXCLUSIVE-MODIFIED-LOCKED state.

When a processor receives a Forward Read Shared command and if a data block is in the EXCLUSIVE-MODIFIED state, the data block is written back to main memory with a Write Shared command with the lock status bit cleared. If the data block is in the EXCLUSIVE-MODIFIED-LOCKED state, the write transaction is made with the lock status bit set.

When a processor needs to evict a data block which is in the EXCLUSIVE-MODIFIED state, the block is written back to main memory with a Write Unowned transfer with the lock status bit cleared. If the block is in the EXCLUSIVE-MODIFIED-LOCKED state, the write transaction is made with the lock status bit set.

What is claimed is:

1. In a computer system including a plurality of nodes and at least one memory device, each at least one memory device storing one or more data blocks, at most one of the plurality of nodes having, at any one time, write access to any one of the one or more data blocks, each of the at least one memory device comprising:
   a) a storage space for one or more data blocks;
   b) a memory directory for maintaining information associated with the one or more data blocks, the memory directory including, for each data block stored in the storage space,
      i) a respective data block identification field for identifying the data block, and
      ii) a respective memory state field, wherein the memory state field maintains one of a plurality of states including a SHARED-UNMODIFIED state, an EXCLUSIVE-MODIFIED state, and a FORWARD-EXCLUSIVE state;
   c) the memory device operating to determine, for each of the one or more data blocks,
      i) whether any one of the plurality of nodes has write access to a respective one of the one or more data blocks, and
      ii) whether any one of the plurality of nodes has requested exclusive read access to the respective one of the one or more data blocks by issuing a Read Exclusive command to the memory device for the respective one of the one or more data blocks;
   d) the memory device operating to set the memory state field for each of the one or more data blocks:
      i) to the SHARED-UNMODIFIED state in response to the memory device determining that none of the plurality of nodes has write access to a copy of a respective one of the one or more data blocks;
      ii) to the EXCLUSIVE-MODIFIED state in response to the memory device determining that one and only one of the plurality of nodes has write access to the respective one of the one or more data blocks;
      iii) to the FORWARD-EXCLUSIVE state in response to the memory device determining that the memory state field for the respective one of the one or more data blocks is in the EXCLUSIVE-MODIFIED state and the memory device further determining that there is an outstanding Read Exclusive command from one of the plurality of nodes; and
   e) the memory device further operating to delay processing any additional read commands for any one of the one or more data blocks determined to be in the FORWARD-EXCLUSIVE state until processing of a respective outstanding Read Exclusive command is complete.

2. The memory device of claim 1, wherein
   a) the plurality of states further includes a FORWARD-SHARED state;
   b) said memory device further operating to set the memory state field for each one of the one or more data blocks to the FORWARD-SHARED state in response to the memory device determining that said one of the one or more data blocks is in the EXCLUSIVE-MODIFIED state and the memory device further determining that there is an outstanding Read Shared command from one of the plurality of nodes; and
   c) said memory device further operating to not process any additional read commands for any one of the one or more data blocks in the FORWARD-SHARED state until processing of a respective outstanding Read Shared command is complete.

3. The memory device of claim 2, wherein
   a) said memory directory further includes, for each data block to be store, a block owner identification field, wherein said block owner identification field maintains unique address information for a one and only node having write access to the data block; and b) wherein said memory directory indicates data block ownership by maintaining in said memory state field associated with the data block an EXCLUSIVE-MODIFIED state and by maintaining in the block owner identification field associated with the data block the unique address information for the one and only one node having write access to the data block.

4. The memory device of claim 2, wherein
a) the memory directory further includes, for each data block to be stored, a copy mask field containing a plurality of bits, each bit corresponding to one of the plurality of nodes, wherein setting one or more of the plurality of bits to a first value indicates that a copy of the data block is present at the nodes corresponding to the bits; and
e) said memory device transmits an INVALIDATE command to each of the plurality of nodes if the memory device receives a Read-Exclusive command for a certain one of the data blocks whose copy mask field has a non-zero value.

5. The memory device of claim 1, wherein
a) said memory directory further includes, for each data block to be stored, a block owner identification field, wherein said block owner identification field maintains unique address information for the one and only node having write access to the data block; and
b) wherein said memory directory indicates data block ownership by maintaining in said memory state field associated with the data block an EXCLUSIVE-MODIFIED state and by maintaining in the block owner identification field associated with the data block the unique address information for the one and only one node having write access to the data block.

6. In a computer system including a plurality of nodes and at least one memory device, each at least one memory device storing one or more data blocks, at most one of the plurality of nodes having, at any one time, write access to any one of the one or more data blocks, each of the at least one memory device comprising:
a) a storage space for one or more data blocks;
b) a memory directory for maintaining information associated with the one or more data blocks, the memory directory including, for each data block stored in the storage space,
 i) a respective data block identification field for identifying the data block, and
 ii) a respective memory state field, wherein the memory state field maintains one of a plurality of states including a SHARED-UNMODIFIED state, an EXCLUSIVE-MODIFIED state, and a FORWARD-EXCLUSIVE state;
c) the memory device operating to determine, for each of the one or more data blocks,
 i) whether any one of the plurality of nodes has write access to a respective one of the one or more data blocks, and
 ii) whether any one of the plurality of nodes has requested non-exclusive read access to the respective one of the one or more data blocks by issuing a Read Shared command to the memory device for the respective one of the one or more data blocks;
d) the memory device operating to set the memory state field for each of the one or more data blocks:
 i) to the SHARED-UNMODIFIED state in response to the memory device determining that none of the plurality of nodes has write access to a copy of a respective one of the one or more data blocks;
 ii) to the EXCLUSIVE-MODIFIED state in response to the memory device determining that one and only one of the plurality of nodes has write access to the respective one of the one or more data blocks;
 iii) to the FORWARD-EXCLUSIVE state in response to the memory device determining that the memory state field for the respective one of the one or more data blocks is in the EXCLUSIVE-MODIFIED state and the memory device further determining that there is an outstanding Read Shared command from one of the plurality of nodes; and
g) the memory device further operating to not process any additional read commands for any one of the one or more data blocks determined to be in the FORWARD-SHARED state until processing of said Read Shared command is complete.

7. The memory device of claim 6, wherein
a) said memory directory further includes, for each data block to be stored, a block owner identification field, wherein said block owner identification field maintains unique address information for the one and only node having write access to the data block; and
b) wherein said memory directory indicates data block ownership by maintaining in said memory state field associated with the data block an EXCLUSIVE-MODIFIED state and by maintaining in the block owner identification field associated with the data block the unique address information for the one and only one node having write access to the data block.

8. In a computer system including a plurality of nodes and at least one memory device, each at least one memory device storing one or more data blocks, at most one of the plurality of nodes having, at any one time, write access to any one of the one or more data blocks, each of the at least one memory device comprising:
a) a storage space for one or more data blocks
b) a memory directory for maintaining information associated with one or more data blocks, the memory directory including, for each data block to be stored,
 i) a respective data block identification field for identifying the data block,
 ii) a respective memory state field, wherein the memory state field maintains a plurality of states including a SHARED-UNMODIFIED, and EXCLUSIVE-MODIFIED state,
 iii) a block owner identification field, wherein said block owner identification field maintains unique address information for a one and only node having write access to the data block;
c) the memory device operating to determine, for each of the one or more data blocks,
 i) whether any one of the plurality of nodes has write access to a respective one of the one or more data blocks, and
 ii) whether any one of the plurality of nodes has requested exclusive read access to the respective one of the one or more data blocks by issuing a Read Exclusive command to the memory device for the respective one of the one or more data blocks;

d) said memory device operating to set the memory state field for each one of the one or more data blocks;
  i) to the SHARED-UNMODIFIED state in response to the memory device determining that none of the plurality of nodes has write access to a copy of the one of the one or more data blocks;
  ii) to the EXCLUSIVE-MODIFIED state in response to the memory device determining that one and only one of the plurality of nodes has write access to the one of the one or more data blocks; and e) the memory device setting the memory state field associated with the one of the one or more data blocks to an EXCLUSIVE-MODIFIED state and storing in the block owner identification field associated with the one of the one or more data blocks the unique address information for the one and only one node having write access to the one of the one or more data blocks to indicate ownership of each one of the one or more data blocks.

9. A multi-node computer system, comprising:
(a) a memory device including a memory control mechanism and a plurality of data blocks in either modified or unmodified form;
(b) a plurality of nodes, each of which includes a write-back cache for temporary storage of copies of one or more of the plurality of data blocks, the copies of one or more of the plurality of data blocks being in either modified or unmodified form, at most one of the plurality of nodes having, at any one time, write access to any one of the plurality of data blocks;
(c) a memory/node coupling mechanism connected to each of the nodes and to the memory device;
(d) the memory control mechanism including a memory state identifier for each one of the plurality of data blocks;
e) the memory control mechanism operating to determine, for each of the plurality of data blocks,
  i) whether any one of the plurality of nodes has write access to a respective one of the plurality of data blocks, and
  ii) whether any one of the plurality of nodes has requested exclusive read access to the respective one of the plurality of data blocks by issuing a Read Exclusive command to the memory device for the respective one of the plurality of data blocks;
(f) each one of the memory state identifiers being selectively set by the memory control mechanism to indicate the identification of the respective one of the plurality of data blocks and to indicate one of a plurality of states including a SHARED-UNMODIFIED, EXCLUSIVE-MODIFIED, FORWARD-EXCLUSIVE, and FORWARD-SHARED state for the one of the plurality of data blocks;
(g) each one of the nodes operating independently to selectively issue one or more of the following:
  (i) a Read Shared command requesting the memory device to send to the node a read-only copy of a preselected one of the plurality of data blocks;
  (ii) the Read Exclusive command requesting the memory device to send to the node a writable copy of a preselected one of the plurality of data blocks;
(h) the memory device operating to set the SHARED-UNMODIFIED state for the respective one of the plurality of data blocks in response to the memory device determining that none of the plurality of nodes has write access to a copy of the respective one of the plurality of data blocks;
(i) the memory device operating to set the EXCLUSIVE-MODIFIED state for the respective one of the plurality of data blocks in response to the memory device determining that one and only one of the plurality of nodes has write access to the respective one of the plurality of data blocks;
(j) the memory device operating to set the FORWARD-EXCLUSIVE state for the respective one of the plurality of data blocks in response to the memory device determining that the respective one of the plurality of data blocks is in the EXCLUSIVE-MODIFIED state and further determining that there is an outstanding Read Exclusive command from one of the plurality of nodes, the memory device further operating to delay processing any additional read commands to the respective one of the plurality of data blocks until processing of the outstanding Read Exclusive command is complete; and
(k) the memory device operating to set the FORWARD-SHARED state for the respective one of the plurality of data blocks in response to the memory device determining that the respective one of the plurality of data blocks is in the EXCLUSIVE-MODIFIED state and further determining that there is an outstanding Read Shared command, the memory device further operating to delay processing any additional read commands to the respective one of the plurality of data blocks until processing of the outstanding Read Shared command is complete.

10. A multi-node computer system, which comprises:
(a) a memory device including a memory control mechanism and a plurality of data blocks in either modified or unmodified form;
(b) a plurality of nodes, each of which includes a write-back cache for temporary storage of copies of one or more of the plurality of data blocks, the copies of one or more of the plurality of data blocks being in either modified or unmodified form, at most one of the plurality of nodes having, at any one time, write access to any one of the plurality of data blocks;
(c) a memory/node coupling mechanism connected to each of said nodes and to said memory device;
(d) said memory control mechanism including a memory state identifier for each one of the plurality of data blocks;
e) the memory device operating to determine, for each of the one or more data blocks,
  i) which, if any, one of the plurality of nodes has write access to a respective one of the plurality of data blocks, and
  ii) which, if any, one of the plurality of nodes has requested exclusive read access to the respective one of the plurality of data blocks by issuing a Read Exclusive command to the memory device for the respective one of the plurality of data blocks;

(f) each one of the memory state identifiers being selectively set by said memory control mechanism to indicate the identification of the respective one of the plurality of data blocks and to indicate one of a plurality of states including a SHARED-UNMODIFIED, EXCLUSIVE-MODIFIED, and UNOWNED state for said one of the plurality of data blocks;

(i) the memory device operating to set the SHARED-UNMODIFIED state for the respective one of the plurality of data blocks in response to the memory device determining that none of the plurality of nodes has write access to a copy of the respective one of the plurality of data blocks, (ii) the memory device operating to set the EXCLUSIVE-MODIFIED state for the respective one of the plurality of data blocks in response to the memory device determining that one and only one of the plurality of nodes has write access to the respective one of the plurality of data blocks, (iii) the UNOWNED state in response to the memory device determining that none of the plurality of nodes has a copy of the respective one of the plurality of data blocks;

(g) each one of said nodes operating independently to selectively issue one or more of the following:

(i) a Read Shared command requesting of the memory device to send to the node a read-only copy of a preselected one of the plurality of data blocks;

(ii) a Read Exclusive command requesting of the memory device to send to the node a writable copy of a preselected one of the plurality of data blocks;

(iii) a Write Unowned command for storing in the memory device a preselected one of the copies of one or more of the plurality of data blocks from the node;

(iv) a Write Shared command for storing in the memory device a preselected one of the copies of one or more of the plurality of data blocks from the node subsequent to a Read Shared command issued by another node;

(v) a Read Data Response command for sending a preselected one of the copies of one or more of the plurality of data blocks to another node subsequent to a Read Exclusive or Read Shared command issued by said another node; and (vi) a Forward Acknowledge command to notify said memory device that a Read Exclusive command has been processed;

(h) said memory device operating to selectively issue one or more of the following:

(i) a Read Data Response command for sending a preselected one of the plurality of data blocks to one of the plurality of nodes in response to either a Read Shared or Read Exclusive command from the one of the plurality of nodes in response to the memory state identifier associated with the preselected one of the plurality of data blocks indicating said preselected one of the plurality of data blocks is in either the SHARED-UNMODIFIED or UNOWNED state;

(ii) a Forward Read Shared command to one of the plurality of nodes, for sending a preselected one of the copies of one or more of the plurality of data blocks from said one of the plurality of nodes to the memory device and to another one of the plurality of nodes, the memory device issuing the Forward Read Shared command to said one of the plurality of nodes in response to 1) the memory device receiving a Read Shared command from said another one of the plurality of nodes, 2) the memory state identifier associated with the preselected one of the plurality of data blocks indicating said preselected one of the plurality of data blocks is in the EXCLUSIVE-MODIFIED state, and 3) the one of the plurality of nodes being determined by the memory device to have write access to the preselected one of the plurality of data blocks;

(iii) a Forward Read Exclusive command to one of the plurality of nodes, for sending a preselected one of the copies of one or more of the plurality of data blocks from said one of the plurality of nodes to another of the plurality of nodes and for returning a Forward Acknowledge command to the memory device from said one of the plurality of nodes, the memory device issuing the Forward Read Exclusive command to said one of the plurality of nodes in response to 1) the memory device receiving a Read Exclusive command from said another of the plurality of nodes, 2) the memory state identifier associated with the preselected one of the plurality of data blocks indicating said predetermined one of the plurality of data blocks is in the EXCLUSIVE-MODIFIED state, and 3) the one of the plurality of nodes being determined by the memory device to have write access to the preselected one of the plurality of data blocks; and (iv) an Invalidate command issued to each of the plurality of nodes to request an identified preselected one of the copies of one or more of the plurality of data blocks be marked invalid.

11. The multi-node computer system of claim 10 further comprising, in each one of said nodes, a data block state directory which includes for each preselected one of the copies of one or more of the plurality of data blocks, the identification of each preselected one of the copies of one or more of the plurality of data blocks and an associated data block coherency state, each one of said nodes operating to determine, for each preselected copy of one or more of the plurality of data blocks, the associated data block coherency state.

12. The multi-node computer system of claim 11 wherein each associated data block coherency state in each of one of said nodes is set to a) a SHARED-UNMODIFIED state in response to a respective node determining that the associated preselected one of the copies of one or more of the plurality of data blocks is valid and the respective node further determining that it does not have write access to the preselected one of the copies of one or more of the plurality of data blocks;

b) an EXCLUSIVE-MODIFIED state in response to the respective node determining that the associated preselected one of the copies of one or more of the plurality of data blocks is valid and the respective node further determining that it has exclusive write access to the preselected one of the copies of one or more of the plurality of data blocks;

c) an EXCLUSIVE-MODIFIED PENDING in response to the respective node determining that it does not contain the associated preselected one of the copies of one or more of the plurality of data blocks and the respective node has issued a Read Exclusive command for the associated preselected one of the copies of one or more of the plurality of data blocks;

d) a SHARED-UNMODIFIED PENDING in response to the respective node determining that it does not contain the associated preselected one of the copies of one or more of the plurality of data blocks and the respective node has issued a Read Shared command for the associated preselected one of the copies of one or more of the plurality of data blocks; and e) an INVALID state in response to the respective node determining that the associated preselected one of the copies is invalid.

13. The multi-node computer system of claim 6 wherein said memory-node coupling mechanism comprises a cross bar switch which couples each of plurality of nodes to said memory device.

14. The multi-node computer system of claim 10 wherein each of said memory state identifiers includes a block owner identification field to indicate which one of the plurality of nodes, if any, maintains an associated one of the copies of one or more of the plurality of data blocks in the EXCLUSIVE-MODIFIED state.

15. The multi-node computer system of claim 10 wherein each of said memory state identifiers includes a copy mask field to indicate which of the plurality of nodes, if any, maintains an associated one of the copies of one or more of the plurality of data blocks in the SHARED-UNMODIFIED state.

16. The multi-node computer system of claim 10 wherein the memory device operates to set the FORWARD-EXCLUSIVE state for the respective one of the plurality of data blocks in response to the memory device determining that the respective one of the plurality of data blocks is in the EXCLUSIVE-MODIFIED state and the memory device further determining that there is an outstanding Read Exclusive command from one of the plurality of nodes, and the memory device further operating to not process any additional read commands to the respective one of the plurality of data blocks until processing of said outstanding Read Exclusive command is complete.

17. The multi-node computer system of claim 10 wherein the memory device operates to set the FORWARD-SHARED state for the respective one of the plurality of data blocks in response to the memory device determining that the respective one of the plurality of data blocks is in the EXCLUSIVE-MODIFIED state and the memory device further determining that there is an outstanding Read Shared command, and the memory device further operating to not process any additional read commands to the respective one of the plurality of data blocks until processing of said Read Shared command is complete.

18. In a memory device for connection to a computer system having a multiplicity of nodes, at least two of the nodes having a write-back cache, said caches and memory device adapted to store one or more data blocks, at most one of the at least two of the nodes having, at any one time, read-AND-write access to any one of the one or more data blocks stored in the memory device, each data block having associated therewith a coherency state, a computer implemented method of maintaining data block coherency among the memory device and said multiplicity of nodes, the method comprising the steps of:

reserving memory space in the memory device for storing the coherency state of each data block;

determining, for each data block, whether any one of the at least two nodes has read-AND-write access to said each data block, and further determining whether any one of the at least two nodes has requested read-AND-write access to said each data block;

storing in the space reserved for the coherency state of each data block;

the coherency state of SHARED-UNMODIFIED in response to none of the plurality of nodes having read-AND-write access to the data block;

the coherency state of EXCLUSIVE-MODIFIED in response to one and only one node having read-AND-write access to the data block;

the coherency state of FORWARD-EXCLUSIVE in response to the coherency state of the data block being EXCLUSIVE-MODIFIED and an other than the one and only one node requesting read-AND-write access to the data block;

inhibiting all requests for read-AND-write or read-only access to a preselected data block in response to the coherency state of the preselected data block being FORWARD-EXCLUSIVE.

19. In a memory device for connection to a computer system having a multiplicity of nodes, at least two of the nodes having a write-back cache, said caches and memory device storing one or more data blocks, at most one of the at least two of the nodes having, at any one time, write access to any one of the one or more data blocks stored in the memory device, each data block having associated therewith a coherency state, a computer implemented method of maintaining data block coherency among the memory device and said multiplicity of nodes, the method comprising the steps of:

reserving memory space in the memory device for storing the coherency state of each data block;

determining, for each data block, whether any one of the at least two nodes has read-AND-write access to said each data block, and further determining whether any one of the at least two nodes has requested read-AND-write access to said each data block;

storing in the space reserved for the coherency state of each data block;

the coherency state of SHARED-UNMODIFIED in response to none of the plurality of nodes having read-AND-write access to the data block;

the coherency state of EXCLUSIVE-MODIFIED in response to one and only one node having read-AND-write access to the data block;

the coherency state of FORWARD-SHARED in response to the coherency state of the data block being EXCLUSIVE-MODIFIED and an other than the one and only one of the plurality of nodes requesting read-only access to the data block;

inhibiting all requests for read-AND-write or read-only access to a preselected data block in response to the coherency state of the preselected data block being FORWARD-SHARED.

20. In a memory device for connection to a multi-node computer system including a plurality of nodes, said memory device including storage space for one or more data blocks, at most one of the plurality of nodes having, at any one time, write access to any one of the one or more data blocks, a computer implemented method of maintaining information associated with one or more data blocks, said method comprising the steps of:
reserving, for each data block to be stored, a data block identification field;
reserving, for each data block to be stored, a block owner identification field;
reserving, for each data block to be stored, a memory state field;
determining whether any of the plurality of nodes has write access to the respective data block;
storing, in the data block identification field for each data block to be stored, identification information for each data block;
storing, in said memory state field for each data block to be stored, one of a plurality of states including
a SHARED-UNMODIFIED state in response to none of the plurality of nodes being determined to have write access to a respective data block,
and an EXCLUSIVE MODIFIED state in response to one and only one of the plurality of nodes being determined to have write access to the respective data block;
indicating ownership of a certain data block to be stored by storing in a certain memory state field associated with the certain data block an EXCLUSIVE-MODIFIED state and by storing in the block owner identification field unique address information for a one and only one node determined to have write access to the certain data block;
indicating that no node has write access to the certain data block by storing in the certain memory state field associated with the certain data block to be stored a SHARED-UNMODIFIED state.

21. The method of claim 20, further including the steps of:
reserving, for each data block to be stored, a copy mask field containing a plurality of bits, each bit corresponding to one of the plurality of nodes; and
setting one or more of the plurality of bits to a first value in response to a copy of the data block being determined to be present at the nodes corresponding to the bits.

22. The method of claim 20, further including the steps of:
reserving, for each data block to be stored, a copy mask field containing a plurality of bits, each bit corresponding to one of the plurality of nodes; and
setting one or more of the plurality of bits to a first value in response to a copy of the data block being determined to be present at the nodes corresponding to the bits.

23. In a computer system comprising a first and a second node and a separate memory device, each of the nodes having a write-back cache, wherein the memory device and the nodes include storage space for one or more data blocks, each data block having associated therewith a coherency state, a computer implemented method of maintaining data block coherency among the memory device and the nodes, said method comprising the steps of:
reserving space in the memory device for storing the coherency state of one or more data blocks;
reserving space in the memory device for storing ownership identification information of one or more data blocks;
storing in the space reserved for the coherency state of a data block the coherency state of EXCLUSIVE-MODIFIED in response to said first node being determined to have read-AND-write access to the data block;
storing in the space reserved for ownership identification information of the data block, the identification of said first node in response to said first node being determined to have read-AND-write access to the data block;
sending from said second node to the memory device a command to provide to said second node the data block for the purpose of read-AND-write access;
checking the space reserved for the coherency state of the data block to determine whether the data block is in the EXCLUSIVE-MODIFIED state;
responding to the data block being in the EXCLUSIVE-MODIFIED state, checking the space reserved for the ownership identification of the data block to determine which node owns the data block;
sending from the memory device to said first node a command to send the data block to said second node in response to the determination that the first node owns the data block;
changing the stored coherency state of the data block from EXCLUSIVE-MODIFIED to FORWARD-EXCLUSIVE;
responding to the command to said first node by sending to said second node the data block;
sending to the memory device an acknowledgment signal that the command to said first node has been processed;
changing the stored coherency state of the data block from FORWARD-EXCLUSIVE to EXCLUSIVE-MODIFIED; and
changing the stored ownership identification information of the data block from the identification of the first node to the identification of the second node.

24. The method of claim 23, wherein the computer system further comprises a third node, the method further comprising the steps of:
when the coherency state of the data block is in the FORWARD-EXCLUSIVE state, sending from said third node to the memory device a command to provide to said third node the data block for the purpose of either read-AND-write or read-only access;
inhibiting the command from said third node until the coherency state for the data block changes from FORWARD-EXCLUSIVE to EXCLUSIVE-MODIFIED.

25. In a computer system comprising a first and a second node and a separate memory device, each of the nodes having a write-back cache, wherein the memory device and the nodes include storage space for one or more data blocks, each data block having associated therewith a coherency state, a computer implemented method of maintaining data block coherency among the memory device and the nodes, said method comprising the steps of:

reserving space in the memory device for storing the coherency state of one or more data blocks;

reserving space in the memory device for storing ownership identification information of one or more data blocks;

storing in the space reserved for the coherency state of a given data block the coherency state of EXCLUSIVE-MODIFIED in response to said first node being determined to have read-AND-write access to the data block;

storing in the space reserved for the ownership identification information of the data block, the identification of said first node in response to said first node being determined to have read-AND-write access to the data block;

sending from said second node to the memory device a command to provide to said second node the data block for the purpose of read-only access;

checking the space reserved for the coherency state of the data block to determine whether the data block is in the EXCLUSIVE-MODIFIED state;

responding to the data block being in the EXCLUSIVE-MODIFIED state, checking the space reserved for the ownership identification of the data block to determine which node owns the data block;

sending from the memory device to said first node a command to send the data block to said second node in response to the determination that the first node owns the data block;

changing the stored coherency state of the data block from EXCLUSIVE-MODIFIED to FORWARD-SHARED;

responding to the command to said first node by sending to said second node the data block;

sending to the memory device an acknowledgment signal that the command to said first node has been processed;

changing the stored coherency state of the data block from FORWARD-SHARED to SHARED-UNMODIFIED.

26. The method of claim 22, wherein the computer system further comprises a third node, the method further comprising the steps of:

when the coherency state of the data block is in the FORWARD-SHARED state, sending from said third node to the memory device a command to provide to said third node the data block for the purpose of either read-AND-write or read-only access;

inhibiting the command to provide to said third node the data block until the coherency state for the data block changes from FORWARD-SHARED to SHARED-UNMODIFIED.

27. In a computer system including a plurality of nodes and at least one memory device, each at least one memory device storing one or more data blocks, at most one of the plurality of nodes having, at any one time, write access to any one of the one or more data blocks, each of the at least one memory device comprising:

a) a storage space for one or more data blocks;

b) a memory directory for maintaining information associated with the one or more data blocks, the memory directory including, for each data block stored in the storage space,
  i) a respective data block identification field for identifying the data block, and
  ii) a respective memory state field, wherein the memory state field maintains one of a plurality of state including a SHARED-UNMODIFIED state and an EXCLUSIVE-MODIFIED state,
  iii) a block owner identification field, wherein said block owner identification field maintains unique address information for a one and only node having write access to the data block,
  iv) a copy mask field containing a plurality of bits, each bit corresponding to one of the plurality of nodes, wherein setting one or more of the plurality of bits to a non-zero value indicates that a copy of the data block is present at the nodes corresponding to the bits;

c) the memory device operating to set the memory state field and the block owner identification field in said memory directory to indicate data block ownership of each one of the one or more data blocks by setting in the memory state field associated with the one of the one or more data blocks an EXCLUSIVE-MODIFIED state and by storing, in the block owner identification field associated with the one of the one or more data blocks, the unique address information for the one and only one node having write access to the one of the one or more data blocks;

d) said memory device responding to receiving a Read-Exclusive command for a particular one of the data blocks whose copy mask field has a non-zero value by transmitting an INVALIDATE command to each of the plurality of nodes indicated by the copy mask field.

* * * * *